United States Patent [19]
Ohmori et al.

[11] Patent Number: 6,061,220
[45] Date of Patent: May 9, 2000

[54] POWER SWITCHING CIRCUIT OF NETWORK-CONNECTED DEVICE

[75] Inventors: Takeshi Ohmori; Kenji Oguma, both of Tokyo, Japan

[73] Assignee: NEC Corporation, Tokyo, Japan

[21] Appl. No.: 09/328,394

[22] Filed: Jun. 9, 1999

[30] Foreign Application Priority Data

Jun. 10, 1998 [JP] Japan .................................. 10-161731

[51] Int. Cl.$^7$ .................................................. H02H 3/00
[52] U.S. Cl. ............................... 361/84; 361/82; 361/58; 361/115
[58] Field of Search ................................. 361/82, 84, 58, 361/115, 18

[56] References Cited

U.S. PATENT DOCUMENTS

| | | | |
|---|---|---|---|
| 3,577,125 | 5/1971 | Frisbie | .................................... 340/166 |
| 4,023,081 | 5/1977 | Murray | .................................... 318/109 |

FOREIGN PATENT DOCUMENTS 6-187072  7/1994  Japan ................................ H02J 3/00

OTHER PUBLICATIONS

"P1394 Standard for a High Performance Serial Bus," P1394, Draft 8.0v4, IEEE Standards Department, pp. 84–85 (Nov. 1995).

*Primary Examiner*—Stephen W. Jackson
*Attorney, Agent, or Firm*—Foley & Lardner

[57] ABSTRACT

A power switching circuit is provided, which automatically performs the necessary power switching, and by which the power specifications of external devices in a network can be uniformly determined. The power switching circuit comprises, for each external device, (i) a first diode for transmitting the power from the main device to the network, and for preventing power from reversely flowing from the network to the main device; (ii) a second diode for transmitting power from the external device to the main device, and for preventing power from reversely flowing from the main device to the external device; and (iii) a port for physically connecting the main device and the external device. The connection between the external devices is maintained regardless of the state of the power of the main device.

7 Claims, 5 Drawing Sheets

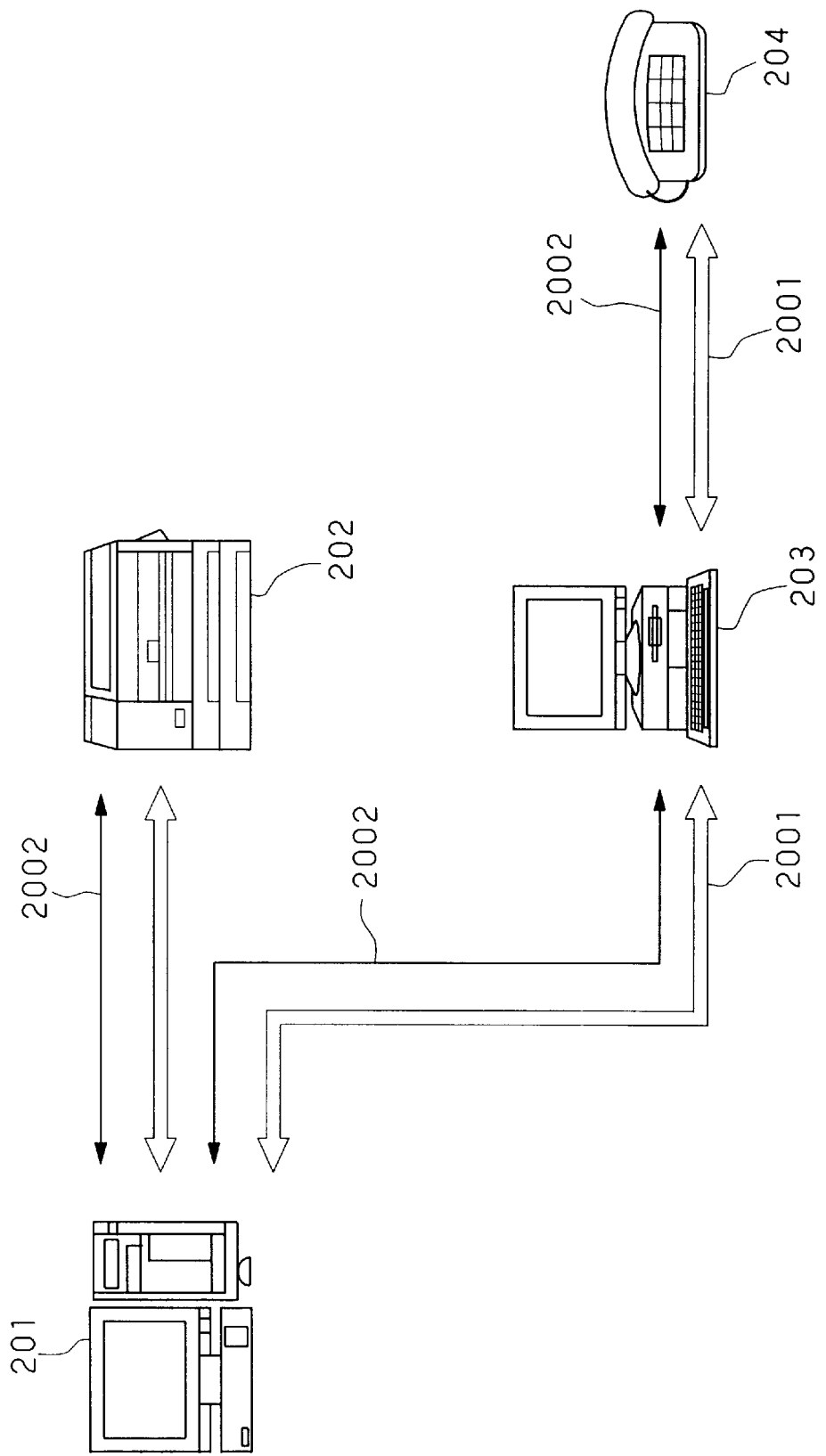

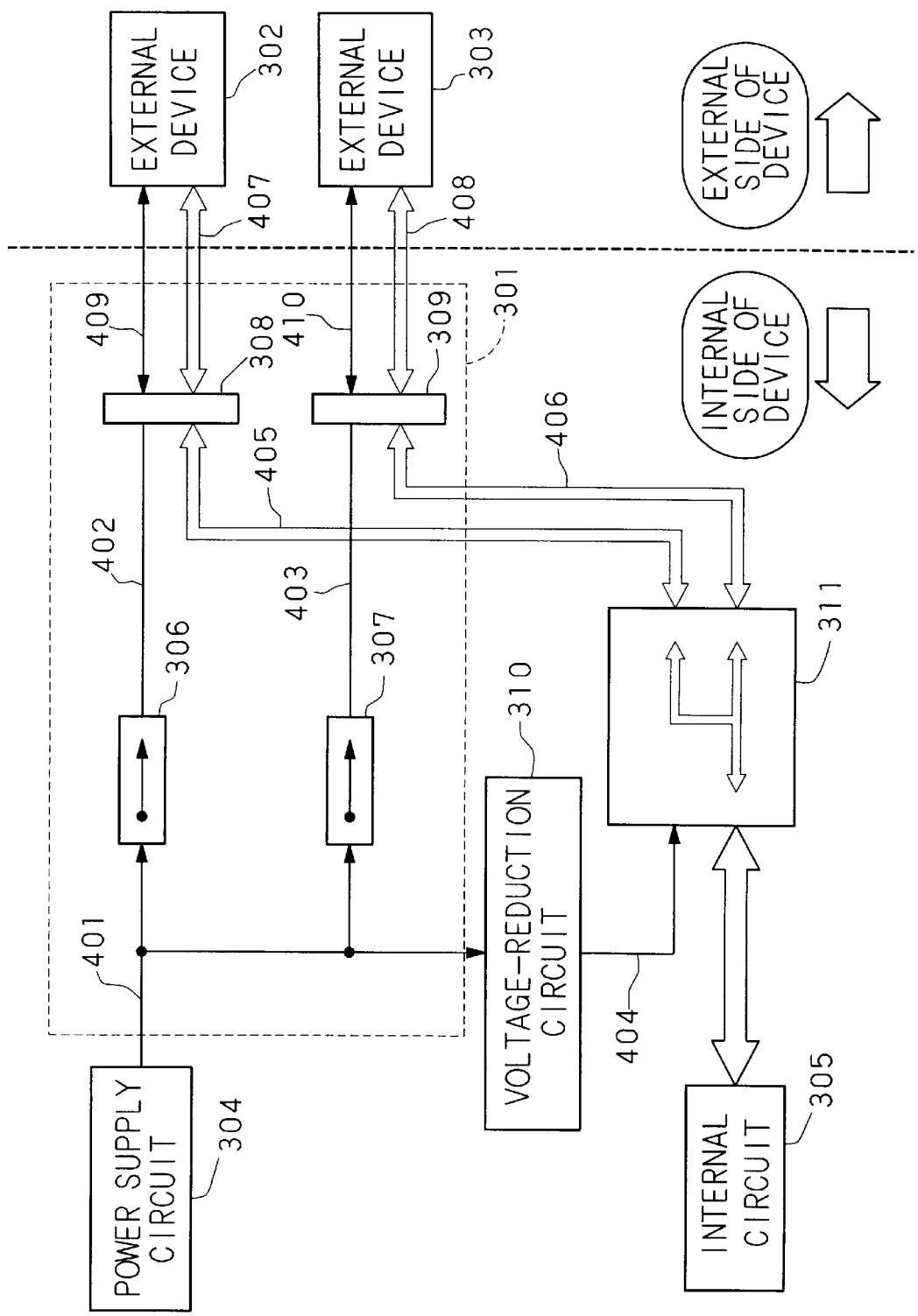

POWER SWITCHING CIRCUIT OF NETWORK-CONNECTED DEVICE

BACKGROUND OF THE INVENTION

1. Field of the Invention

The present invention relates to a device connected to a network, in particular, a power switching circuit provided in a network-connected device.

This application is based on Patent Application No. Hei 10-161731 filed in Japan, the contents of which are incorporated herein by reference.

2. Description of the Related Art

There is a network arrangement in which a plurality of computers and external devices are connected with each other via cables and data transfer and power supply are possible via the cables. In such an arrangement, the power switching circuit for devices connected to the network is generally used for supplying power to the external devices, cables, or physical connection control circuits provided in the computers.

FIG. 4 shows an example of a conventional connection arrangement of external devices. These external devices are provided in a network connection system via computers and cables. Here, external devices 202, 203, and 204 are respectively a printer, a computer, and a telephone. Computer 201 has two connectors: one is connected with external device 202 while the other is connected with external device 203. This external device 203 is also connected with external device 204. The computer 201 and external devices 202 to 204 are connected with each other via data lines 2001 as well as power supply lines 2002, so that data can be transferred via data lines 2001 established between these devices. For example, data can be transferred between external device 204 and computer 201, and also between external devices 203 and 202.

FIG. 5 is a block diagram showing the structure of a conventional power supply circuit provided in a (main) device. This block diagram is based on the conventional power supply circuit disclosed in a prior-art document, "P1394 Standard for a High Performance Serial Bus", P1394, Draft 8.0v4, IEEE Standards Department, pp. 84–85, November, 1995.

Power is supplied from power supply circuit 304 via power supply line 401 to diodes 306 and 307. These power sources passing through diodes 306 and 307 are further supplied via power supply lines 402 and 403, ports 308 and 309, and power supply lines 409 and 410 to external devices 302 and 303. The diodes 306 and 307 prevent the power sources flowing out from the external devices 302 and 303 from back-flowing into the power supply circuit 304. The power supply circuit 304 also supplies power via power supply line 401 to voltage-reduction circuit 310, regardless of the power supply to the above ports. The voltage is reduced by the circuit 310 and the voltage-reduced power is supplied to the physical connection control circuit 311. This physical connection control circuit 311 is connected with an internal circuit 305 of the main device, and is also connected with ports 308 and 309 via data lines 405 and 406. The ports 308 and 309 are respectively connected with external devices 302 and 303 via data lines 407 and 408 as well as power supply lines 409 and 410.

The above conventional example has the following problems.

First, power is supplied to the physical connection control circuit 311 only from the power supply circuit 304. Therefore, when the power of the main device is set to the OFF state, power is not supplied to the physical connection control circuit 311, and the main device and the external devices 302 and 303 are disconnected so that data cannot be transferred between these devices.

In addition, if the external devices 302 and 303 have their own power sources, then power supplied by sources outside via cables are not effectively used.

SUMMARY OF THE INVENTION

In order to solve the above problems, an objective of the present invention is to provide a power switching circuit which automatically performs the necessary power switching, and by which the power specifications of external devices in a network can be uniformly determined.

Therefore, the present invention provides a power switching circuit provided in a main device to which external devices are connected via a network and which comprises a power supply circuit for supplying power; a physical connection control circuit for controlling the physical connection with the external devices; a voltage-reduction circuit, inserted between the power supply circuit and the physical connection control circuit, for reducing the voltage of the power supplied from the power supply circuit; and an internal circuit connected with the voltage-reduction circuit or the physical connection control circuit, and the power switching circuit comprising the following elements for each external device:
a first diode for transmitting the power from the main device to the network, and for preventing power from reversely flowing from the network to the main device;
a second diode for transmitting power from the external device to the main device, and for preventing power from reversely flowing from the main device to the external device; and
a port for physically connecting the main device and the external device, and
wherein connection between the external devices is maintained regardless of the state of the power of the main device.

Accordingly, when the power of the main device is set to the OFF state, power from the external device can be used via the port. Therefore, even if the power of the main device is in the OFF state, the structural elements necessary for connecting the external devices can be operated so that connection between the external devices can be maintained, thereby preventing the network arrangement from being disconnected.

In addition, the diodes function as switches using the backward bias due to the potential difference, a characteristic of the diodes, and the corresponding switching is performed depending on presence or absence of the power of the main device, thereby switching the power-supply route. Therefore, switching between the operation using internal power and the operation using power from an external device can be automatically performed.

Furthermore, in the above structure, a diode for preventing the back-flow of the power exists between the ports. Therefore, power supplied from an external device is not transmitted to another external device. Therefore, in the network construction, it is possible to prevent a situation in which one of the external devices exclusively supplies the power necessary for the network. Therefore, specification of the power for each external device can be uniformly defined.

In the above structure, it is preferable that the port be connected with the first and second diodes via power supply lines, and that the port be also connected with the physical connection control circuit via a data line.

In addition, it is preferable that the power from the power supply circuit be supplied to the port via a power supply line.

It is also preferable that a power supply line be established from the second diode to the internal circuit of the main device.

In this case, the power supplied from the external device can be provided not only to the physical connection control circuit, but also to the internal circuit of the main device.

It is also preferable that a power supply line is established from the second diode via the voltage-reduction circuit to the physical connection control circuit.

In addition, it is preferable that the power provided to the main device be from one of the external devices, said power having the highest voltage in comparison with the other external devices, depending on the efficiency of each second diode.

Furthermore, each external device may be one of a printer, a computer, and a telephone.

BRIEF DESCRIPTION OF THE DRAWINGS

FIG. 4 is a diagram explaining a conventional network arrangement.

FIG. 5 is a block diagram showing the structure of a conventional circuit arrangement.

DESCRIPTION OF THE PREFERRED EMBODIMENTS

Hereinafter, embodiments of the present invention will be explained with reference to the drawings.

Figure 1:
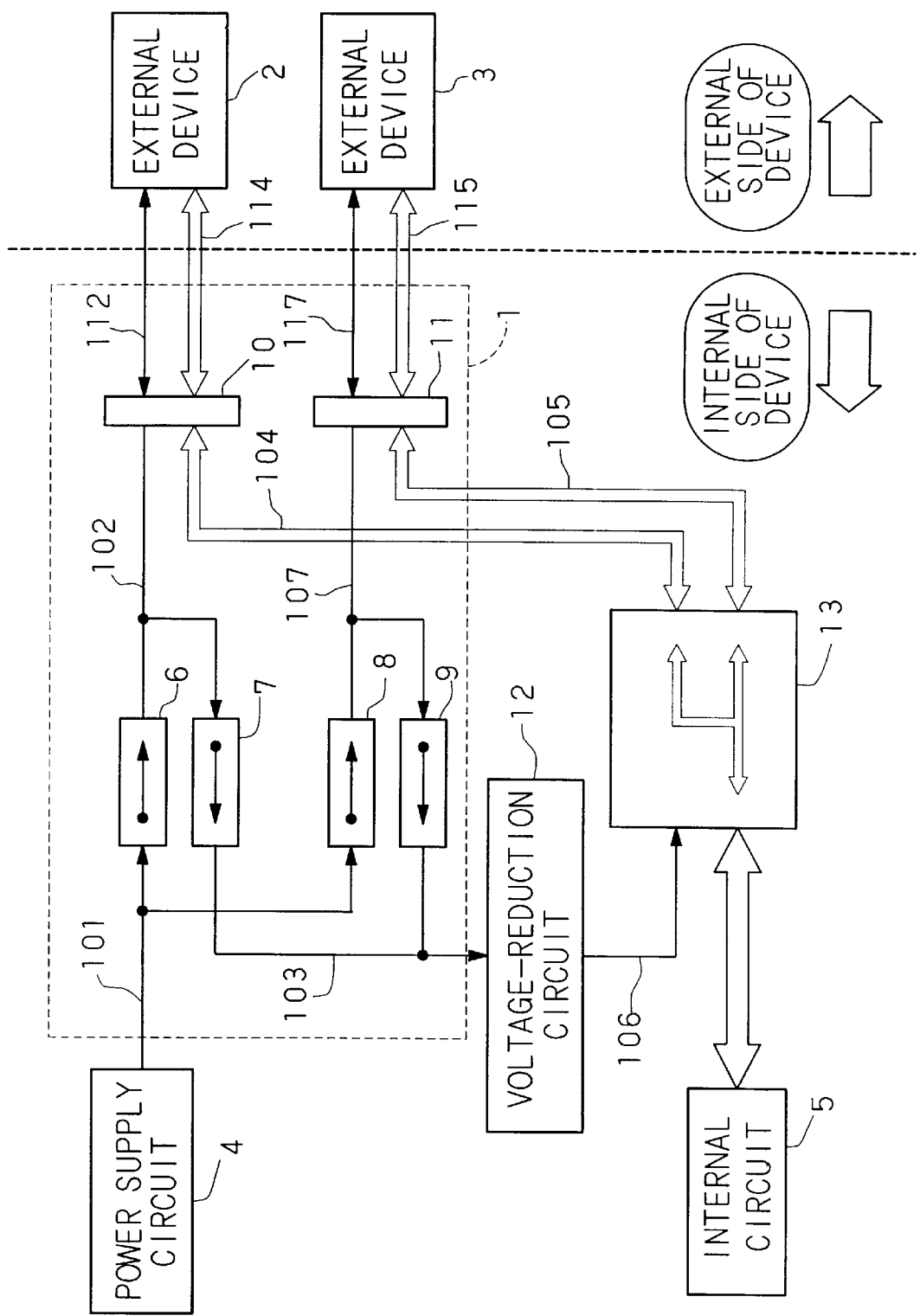
FIG. 1 is a block diagram showing the structure of an embodiment according to the present invention.

FIG. 1 is a block diagram showing the power switching circuit 1 provided in a (main) device connected to a network, as an embodiment of the present invention.

In this circuit, port 10 is connected to diodes 6 and 7 via power supply line 102, and is also connected to physical connection control circuit 13 via data line 104 and to external device 2 via data line 114. Similarly, port 11 is connected to diodes 8 and 9 via power supply line 107, and is also connected to physical connection control circuit 13 via data line 105 and to external device 3 via data line 115. The diode 6 is connected to power supply lines 101 and 102 so that no reverse current flows from external device 2 into power supply circuit 4. Similarly, the diode 8 is connected to power supply lines 101 and 107 so that no reverse current flows from external device 3 into power supply circuit 4. The diode 7, inserted between the power supply lines 102 and 103, transmits the current from the external device 2 via power supply line 112 and port 10 to voltage-reduction circuit 12, and simultaneously prevents the current transmitted from the external device 3 via diode 9 from being transmitted to the external device 2. Similarly, the diode 9, inserted between the power supply lines 103 and 107, transmits the current from the external device 3 via power supply line 117 and port 11 to voltage-reduction circuit 12, and simultaneously prevents the current transmitted from the external device 2 via diode 7 from being transmitted to the external device 3

Figure 2:
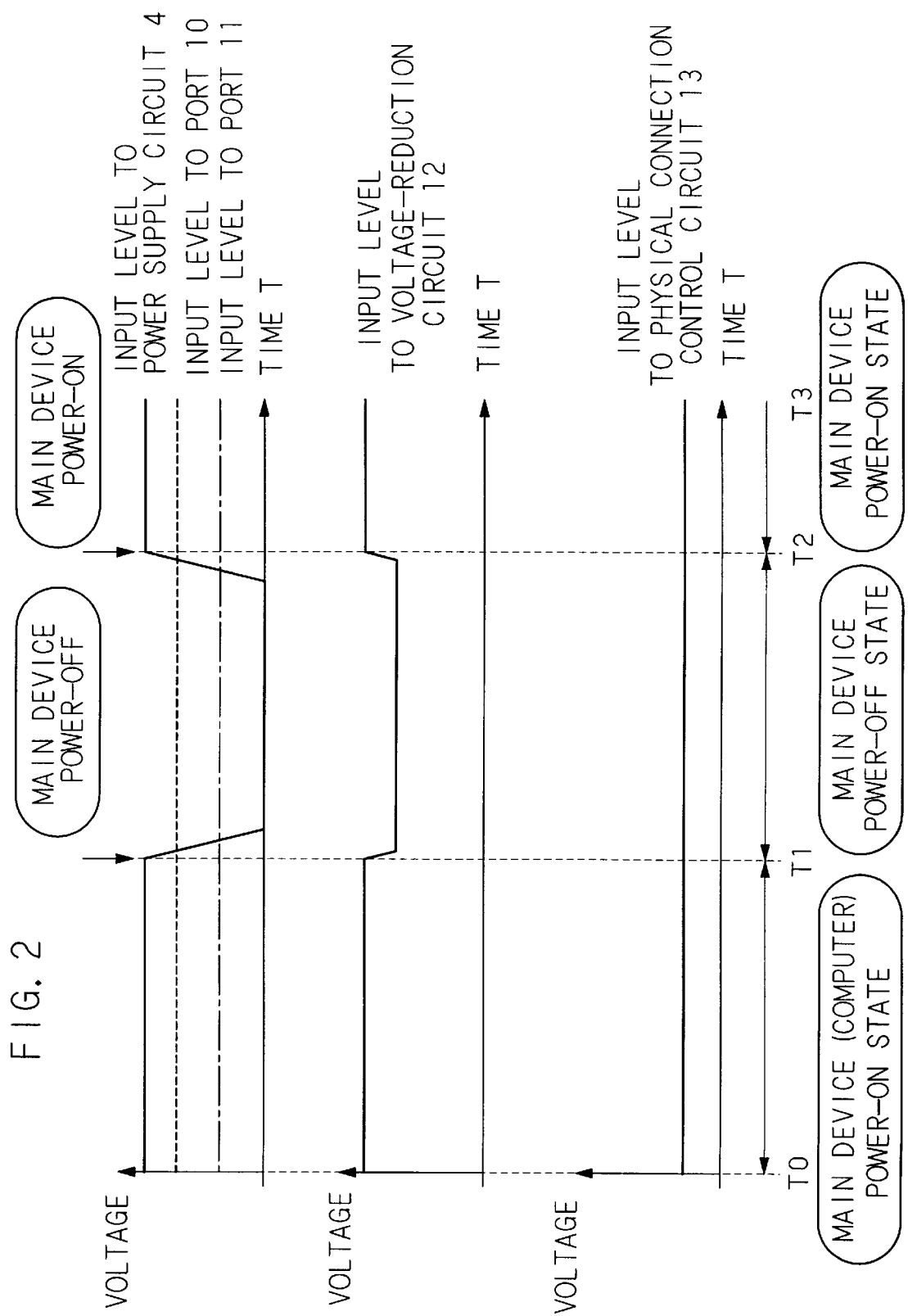
FIG. 2 is a timing chart showing the operations of the embodiment.

FIG. 2 is a timing chart showing the operations of the present embodiment. Generally, when the power of the main device connected to the network, here, a computer, is in the ON state, power is supplied to the power supply circuit 4 from the computer. In the power-ON state from time t0 to t1 (see FIG. 1), the power supplied from the power supply circuit 4 to the power supply line 101 is provided from diode 6 via power supply line 102 to diode 7, and is further provided via power supply line 103 to the voltage-reduction circuit 12. In another route, the power from the power supply circuit 4 is provided from diode 8 via power supply line 107 to diode 9, and is further provided via power supply line 103 to the voltage-reduction circuit 12. This voltage-reduction circuit 12 has a function of reducing the voltage so as to provide the supplied power to the physical connection control circuit 13. Accordingly, power is supplied to the physical connection control circuit 13 so that data can be transmitted between the external devices 2 and 3, and the internal side of the main device.

The power supply circuit 4 can also supply power to port 10 via diode 6 and power supply line 102. That is, when the external device 2 does not have its own power source, power is supplied to this external device via port 10 from the internal side of the main device. Similarly, the power supply circuit 4 can supply power to port 11 via diode 8 and power supply line 107. That is, when the external device 3 does not have its own power source, power is supplied to this external device via port 11 from the internal side of the main device.

If the external device 2 or 3 has its own power source, the relevant external device also supplies power via a cable. However, power is not reversely provided to the power supply circuit 4 because of the potential difference (between the terminals) of diode 6 or 8.

In the power-OFF state from time T1 to T2 (see FIG. 2), no power is supplied from power supply circuit 4 to physical connection control circuit 13. However, if the external device 2 or 3 has its own power source, power is supplied from the external device having its own power source to port 10 or 11. That is, when the power from the power supply circuit 4 is disconnected, the line from port 10 via power supply line 102 to diode 7 becomes effective, so that power is supplied from the diode 7 via the power supply line 103 to the voltage-reduction circuit 12. The voltage-reduced power is supplied to the physical connection control circuit 13. In another route, the line from port 11 via power supply line 107 to diode 9 becomes effective, so that power is supplied from the diode 9 via the power supply line 103 to the voltage-reduction circuit 12. The voltage-reduced power is supplied to the physical connection control circuit 13 also in this route. Accordingly, power is supplied to the physical connection control circuit 13 so that data can be transmitted between the external devices 2 and 3, and the internal side of the main device.

If both the external devices 2 and 3 have their own power sources, power provided via power supply line 103 to the voltage-reduction circuit 12 is supplied from one of the external devices according to the efficiencies of diodes 7 and 9. Here, the provided power has a voltage higher than that of the power from another external device. With reference to FIG. 2, the voltage of the power from the external device 2 is higher than that of the power from the external device 3; thus the power from the external device 2 is supplied to the voltage-reduction circuit 12.

In the power-ON state from time T2 to T3 (see FIG. 2), the power of the main device (i.e., the computer) is again in the ON state; thus, power is supplied from power supply circuit 4, as in the period from T0 to T1.

Another embodiment according to the present invention will be explained below. In the above-explained embodiment, two ports are provided, while in the present embodiment, the number of the ports is not limited and a similar arrangement can be established using any number of ports. In addition, the present power switching circuit can be used in any device (not limited to a computer) which can be connected to a network.

Figure 3:
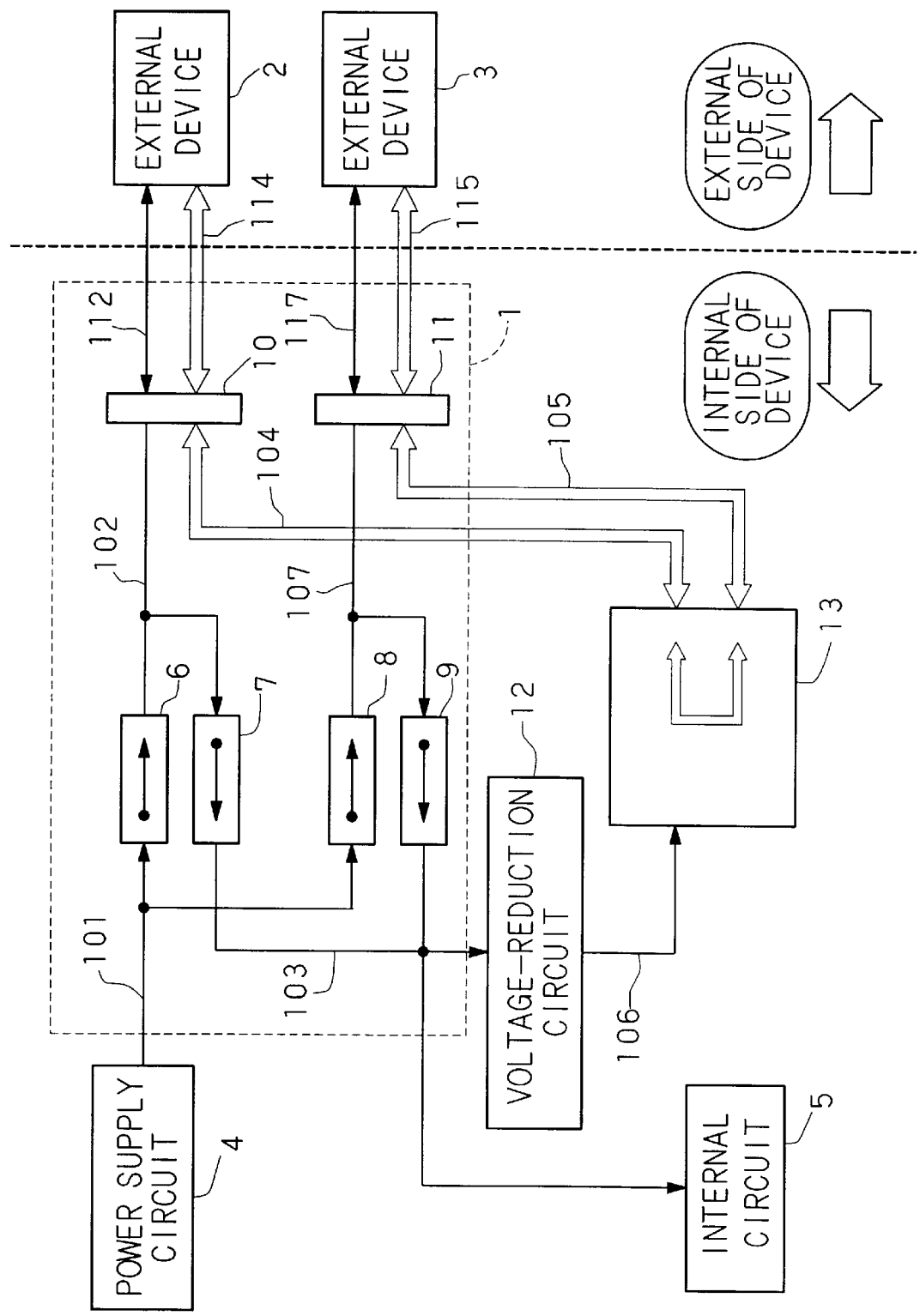
FIG. 3 is a block diagram showing the structure of another embodiment according to the present invention.

FIG. 3 is a block diagram showing another embodiment according to the present invention. In FIG. 3, parts corresponding to those in FIG. 1 are given identical reference numbers, and explanations thereof will be omitted here.

In this embodiment, in addition to the connection line from the diodes 7 and 9 via power supply line 103 to the voltage-reduction circuit 12, a connection line from the power supply line 103 to the internal circuit 5 of the main device is provided. Usually, power is supplied to the internal circuit 5 from another circuit. Therefore, when the power of the main device is in the OFF state, the internal circuit 5 is not operated. However, the power supply line 103 is also connected with the internal circuit 5 in the present embodiment. Therefore, when the main device is in the OFF state, power can be supplied from the external device 2 or 3 not only to the physical connection control circuit 13 but also to the internal circuit 5 of the main device, thereby operating the internal circuit 5.

What is claimed is:

1. A power switching circuit provided in a main device to which external devices are connected via a network and which comprises a power supply circuit for supplying power; a physical connection control circuit for controlling the physical connection with the external devices; a voltage-reduction circuit, inserted between the power supply circuit and the physical connection control circuit, for reducing the voltage of the power supplied from the power supply circuit; and an internal circuit connected with the voltage-reduction circuit or the physical connection control circuit, and the power switching circuit comprising the following elements for each external device:

a first diode for transmitting the power from the main device to the network, and for preventing power from reversely flowing from the network to the main device;

a second diode for transmitting power from the external device to the main device, and for preventing power from reversely flowing from the main device to the external device; and a port for physically connecting the main device and the external device, and wherein connection between the external devices is maintained regardless of the state of the power of the main device.

2. A power switching circuit as claimed in claim 1, wherein the port is connected with the first and second diodes via power supply lines, and the port is also connected with the physical connection control circuit via a data line.

3. A power switching circuit as claimed in claim 1, wherein the power from the power supply circuit is supplied to the port via a power supply line.

4. A power switching circuit as claimed in claim 1, wherein a power supply line is established from the second diode to the internal circuit of the main device.

5. A power switching circuit as claimed in claim 1, wherein a power supply line is established from the second diode via the voltage-reduction circuit to the physical connection control circuit.

6. A power switching circuit as claimed in claim 1, wherein the power provided to the main device is from one of the external devices, said power having the highest voltage in comparison with the other external devices, depending on the efficiency of each second diode.

7. A power switching circuit as claimed in claim 1, wherein the external device is one of a printer, a computer, and a telephone.

* * * * *